G. E. HAZARD.
AUTOMOBILE TIRE PUMP.
APPLICATION FILED AUG. 31, 1918.
1,295,491.
Patented Feb. 25, 1919.
2 SHEETS—SHEET 1.
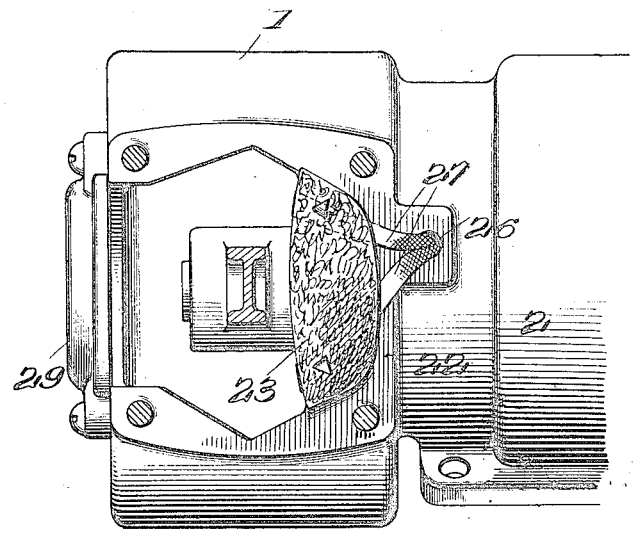
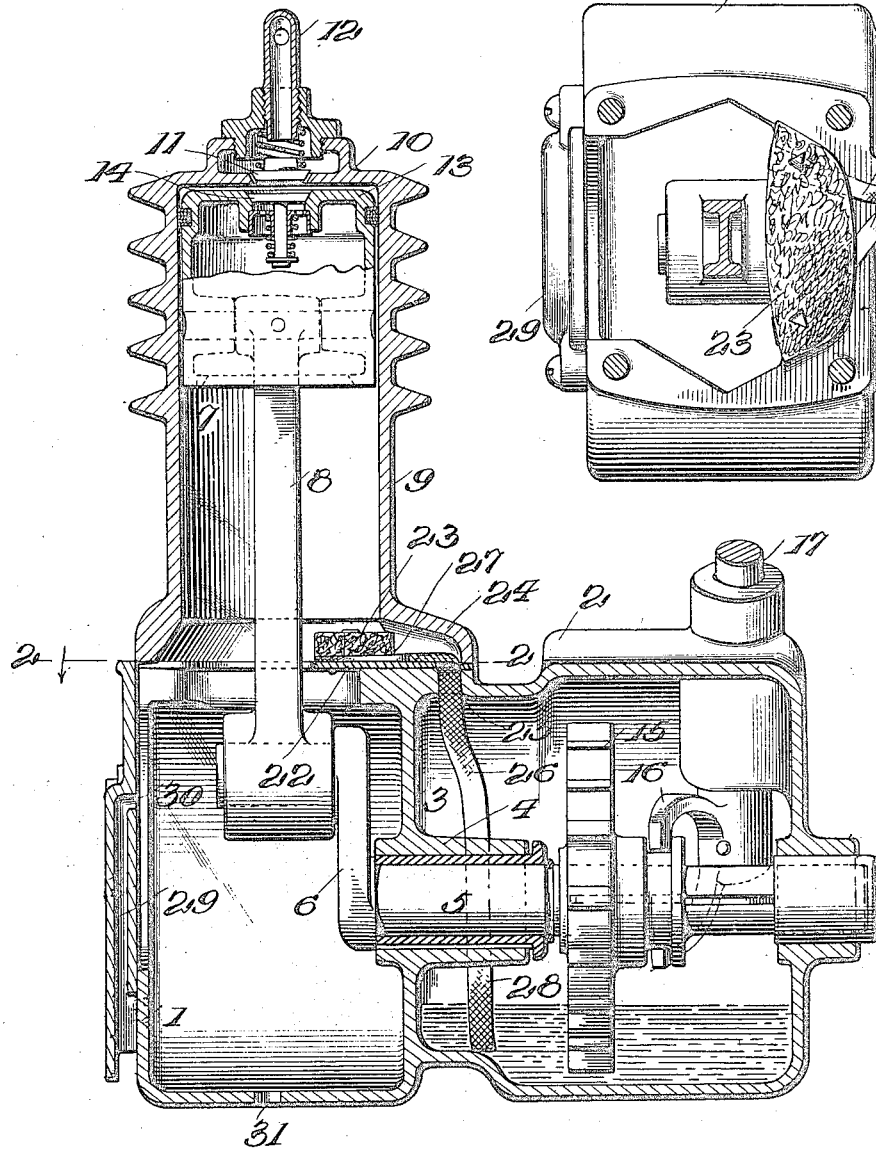
Inventor
George E. Hazard,
By A. S. Pattison
Attorney

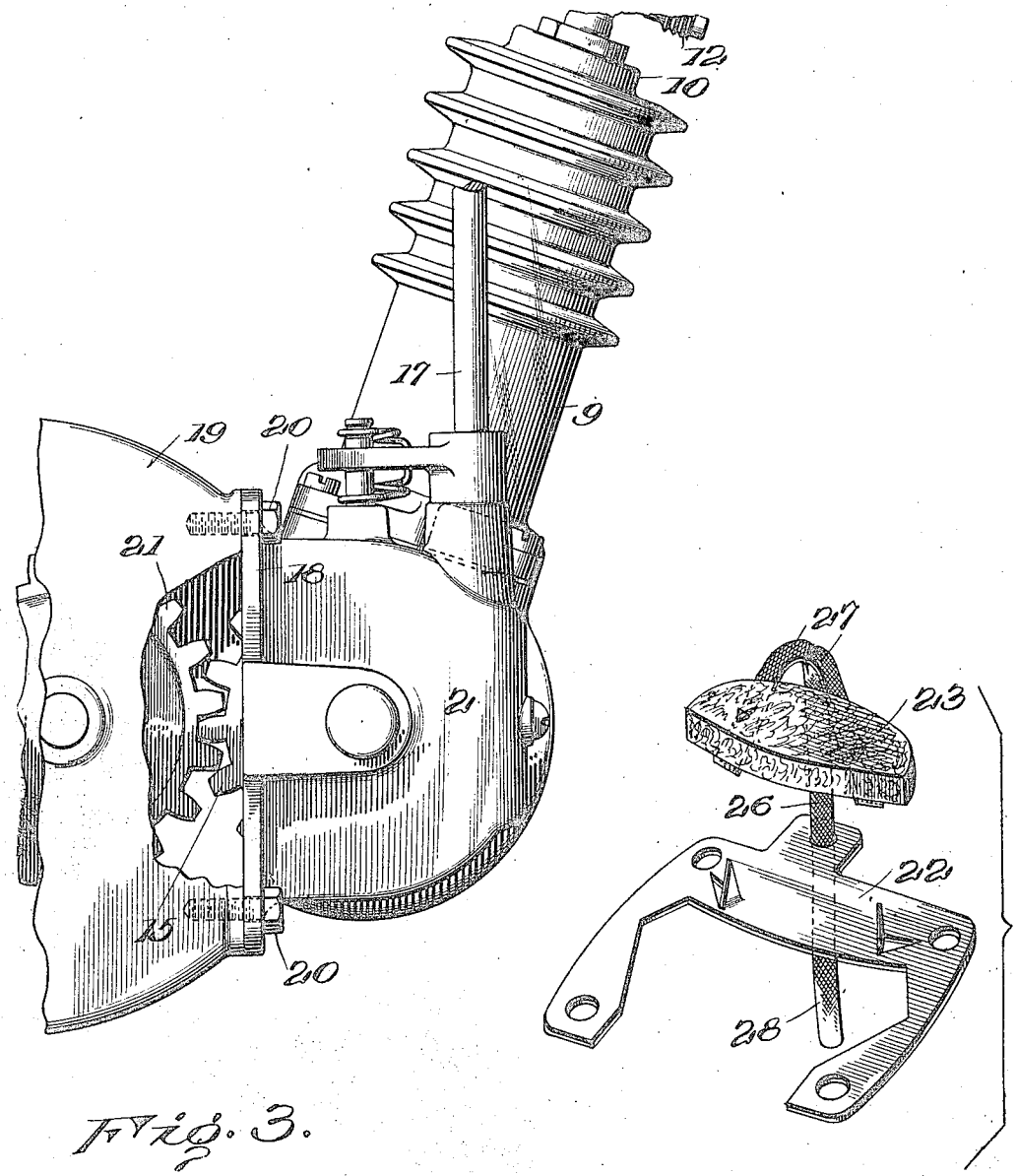

UNITED STATES PATENT OFFICE.

GEORGE E. HAZARD, OF ROCHESTER, NEW YORK, ASSIGNOR TO KELLOGG MANUFACTURING CO., OF ROCHESTER, NEW YORK.

AUTOMOBILE-TIRE PUMP.

1,295,491.   Specification of Letters Patent.   Patented Feb. 25, 1919.

Application filed August 31, 1918. Serial No. 252,167.

*To all whom it may concern:*

Be it known that I, GEORGE E. HAZARD, a citizen of the United States, residing at Rochester, in the county of Monroe and State of New York, have invented certain new and useful Improvements in Automobile-Tire Pumps, of which the following is a specification, reference being had therein to the accompanying drawing.

My invention relates to improvements in automobile tire pumps, and particularly pertains to the manner of providing lubrication for the piston and cylinder.

In all automobile tire pumps heretofore known to me, the lubrication thereof has required the attention of the driver, independent of the lubrication of the automobile mechanism. For this reason the lubrication thereof is frequently overlooked or neglected, and especially when used in the war zone, and because of lack of lubrication the pumps have frequently become ruined and useless.

The object of my present invention is to provide lubrication for the tire pump in such a manner that it does not require any independent attention of the driver, but, to the contrary, receives its lubrication from the necessarily lubricated automobile mechanism, such, for instance, as a transmission or gear case.

In the accompanying drawing—

Figure 1 is a vertical longitudinal sectional view through a tire pump which embodies my improved lubricating system.

Fig. 2 is a horizontal sectional view on the line 2—2 of Fig. 1.

Fig. 3 is an end view of the pump, shown connected with an automobile transmission or gear case.

Fig. 4 is a detached perspective view of the lubricating pad, its supporting member and wick, the pad and supporting member shown in separate relation.

In carrying out my improvement, I provide a pump with the crank case 1, and attached to this crank case 1 is a gear case 2. A web or wall 3 separates the crank case from the gear case. This web or wall 3 is provided with a suitable elongated bearing 4 for a crank shaft 5, which has its crank end 6 within the crank case 1, and operatively connected with the pump piston 7, by suitable connecting rod 8. A pump cylinder 9 is mounted on the crank case and the head 10 of the cylinder is provided with a suitable valved air outlet 11, communicating with a suitable pipe connection 12 to which a hose (not shown) is attached for communicating with the tire (not shown). The head 13 of the piston 7 is also provided with a suitable valved air inlet 14.

As shown, the crank shaft 5 extends through the gear case 2 and carries a sliding gear 15, operated by a yoke 16 connected with the lower end of a suitable operating shaft 17.

The gear case 2 has an open side 18 which is bolted to the gear transmission case 19 by suitable bolts 20, thus placing the gear case 2 in communication with the transmission case 19, the gear 15 extending into the transmission case and adapted to be thrown in and out of mesh with an automobile driven gear 21, for the purpose of rotating the crank shaft 5, and reciprocating the piston 13 to suck in and compress the air in the cylinder 9 and force it through the pipe 12 to pass into the automobile tire.

I have found it essential for a successful tire pump to provide efficient lubrication for the piston and cylinder, and I have also found it equally necessary for a successful tire pump to prevent excess lubrication, in order to avoid oil saturating the air that is fed to the tire, since it is well known that oil will quickly rot rubber. It is, therefore, impossible to use splash lubrication, and in carrying out my present improvement, I provide a member 22, which extends into the lower end of the cylinder 9, and is adapted to receive lubrication on its upper surface to be conveyed to the wall of the cylinder 9 and piston 7. I prefer to support an oil saturated pad 23 on this member 22 and have the piston touch this pad in its downward limit of movement. However, I wish it to be understood that my present invention is not limited to the use of a pad, since the top surface of the member 22 may receive the oil and convey it to the walls of the cylinder, preferably, though not necessarily, by having the lower end of the piston engage the member 22, when the pad 23 is omitted. I find it not necessary to have oil all around the top of the member 22, and thus find sufficient lubrication is provided by having the pad 23 located at one side only of the cylinder and engaged by one side only of the piston 7.

The idea of lubricating by a pad or a member 22 is not the novelty of this invention, as this has been done heretofore. My present invention is providing a supply of oil to the member 22, or pad 23, from the automobile gear case or transmission case, according to which the pump is attached.

My present improvement consists in providing a wick channel 24 substantially at the juncture of the cylinder 9 and crank case 1, one end of the channel communicating with the pad 23, or member 22, and the other end 25, communicating with the gear case 2. A wick 26 has its upper end 27 connected with the pad 23 when that is used, and if not used resting upon or connected with the member 22, and its lower end 28 preferably extending to the bottom of the pump gear case 2.

In the construction of the pump here shown, and which I prefer to use, the air to be compressed passes behind the hood 29 and into the crank case 1, through an opening 30, and then into the cylinder 9 and through the piston 7, to be compressed and forced to the tire, and, preferably, the lower end of the crank case 1 has a constantly open passage 31, to prevent any possibility of the accumulation of lubricant in the crank case.

It will be observed that the crank case 1 and the pump gear case 2, are out of communication with each other, so that lubricant cannot pass from the gear case to the crank case.

It is well known that automobile transmission cases and gear cases are provided with a lubricant and my present invention is constructing the gear case with an open face in communication with the automobile gear or transmission case, so that the pump gear case receives lubricant from the automobile case. In this way lubricant for the pump crank shaft and gear is always insured, and lubrication of the pump piston and cylinder are taken care of and insured through the medium of the wick 26, which communicates with the pump gear case and with the pad 23 or member 22, if the pad is omitted. As shown in Fig. 2, the upper end of the wick 26 is preferably bifurcated and its two ends extending under the pad 23, when that is used, as clearly shown in dotted lines Fig. 2, thus insuring a proper distribution of the lubricant to the pad 23.

By means of this method of lubricating the pump piston and cylinder, the pump needs no lubricating attention after it is once installed, it being necessary for the driver to keep the automobile transmission or gear case provided with lubricant; then the pump lubrication is automatically taken care of and insured. It avoids any possibility of neglecting or overlooking the lubricating of the automobile tire pump, which has been for years one of the problems of automobile driven tire pumps.

This problem has been accentuated by the necessity and large use of tire pumps in the war zone, where lubrication of small parts is so liable to be neglected or overlooked in the confusion and excitment that necessarily exists. For this reason tire pumps have frequently failed to serve their purpose at critical times, because they have not been lubricated. This improved method of lubrication will avoid any such occurrences, and makes the lubrication of the pump a certainty, and after it is installed can be forgotten by the driver, so far as its lubrication is concerned.

Having thus described my invention, what I claim and desire to secure by Letters Patent is—

1. An automobile tire pump comprising a crank case, a cylinder mounted thereon, a gear case carried by the crank case, a crank shaft, a piston in the cylinder operatively connected with the crank shaft, a member approximately at the lower end of the cylinder and adapted to receive oil for lubricating the cylinder and piston walls, the gear case having an open side adapted to be placed in communication with and receive lubrication from an automobile gear case, a channel connecting the pump gear case and the lubricating member, and a wick extending from the lubricating member into the pump gear case, whereby the piston and cylinder are lubricated by a lubricant received from the automobile gear case, for the purpose described.

2. An automobile tire pump comprising a crank case, a gear case attached thereto and separated therefrom by a transverse wall, a cylinder mounted on the crank case, a piston in the cylinder, a crank shaft operatively connected with the piston, a lubricating member approximately at the lower end of the cylinder and in the path traveled by the piston for the purpose of lubricating it, a channel extending from the lubricating member into the gear case, a wick extending from the lubricating member through the channel and into the gear case, the gear case having an open portion adapted to be clamped to and receive lubrication from an automobile gear case, whereby the pump piston and cylinder are lubricated by lubricant received from the automobile gear case, for the purpose described.

3. An automobile tire pump comprising a crank case, a gear case attached thereto and separated therefrom by a transverse wall, a cylinder mounted on the crank case, a piston in the cylinder, a crank shaft operatively connected with the piston, the lower end of the cylinder adjacent the gear case having a channel extending from the lubricating member into the gear case, a wick having one end at the lubricator member extending through the channel and its opposite end in the gear case, the gear case having an open side adapted to be attached to and receive lubricant from an automobile gear case, whereby the pump gear case receives lubricant from the automobile gear case which in turn is transmitted through the wick to the pump piston and cylinder, for the purpose described.

In testimony whereof I hereunto affix my signature in the presence of two witnesses.

GEORGE E. HAZARD.

Witnesses:
V. E. HAZARD,
W. R. GLAVIN.